United States Patent Office 3,056,751
Patented Oct. 2, 1962

3,056,751
CARBON-NITROGEN POLYMERS AND METHOD OF PREPARING SAME
William L. Fierce, Crystal Lake, and Walter J. Sandner, Carpentersville, Ill., assignors to The Pure Oil Company, Chicago, Ill., a corporation of Ohio
No Drawing. Filed May 28, 1959, Ser. No. 816,392
9 Claims. (Cl. 260—1)

This invention relates to new and useful improvements in methods for preparing carbon-nitrogen polymers, and more particularly to an improved method for polymerizing cyanogen or hydrogen cyanide by contact at ambient temperatures with an aqueous solution of a weak acid and a cyanide salt.

Cyanogen, $(CN)_2$ is a well-known compound which is useful as an organic intermediate, and because of its high toxicity has found some use as a fumigant. In recent years, cyanogen has been evaluated as a rocket propellant and found to have only marginal value because of its toxicity and its extremely high combustion temperature (cyanogen and oxygen burn with the hottest flame produced by a chemical reaction). The construction materials presently used in rocket engines cannot handle the high temperature produced by a cyanogen flame and the toxicity of the compound is a substantial obstacle to its utilization. One possible solution to the problems of using cyanogen as a rocket fuel lies in converting it to a solid polymer. At the present time, solid propellants are widely used in both military and non-military rockets. It has been thought that solid polymers of cyanogen might be less toxic and have a sufficiently reduced flame temperature as to be useful as a rocket fuel.

Tricyanotriazine, which is also called cyanuric cyanide, can be considered to have the following structure:

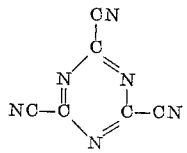

Because of its composition, containing nothing other than 3 mols of cyanogen, tricyanotriazine can be considered to be a trimer of cyanogen. However, in spite of this fact of constitution, tricyanotriazine has never been prepared by the condensation of polymerization of cyanogen. The nitrile (or cyanide) group in organic compounds is unsaturated in character and is highly reactive. Many of the reactions of the nitriles depend upon the ability of the carbon-nitrogen bond to add other groups. Examples of reactions which involve such addition are the hydrolysis of nitriles to carboxylic acids, and the formation of iminoethers by reaction with alcohols. The tendency of many nitriles to polymerize under the influence of certain reagents is another example of this reactivity at the carbon-nitrogen triple bond. Although this tendency is shown by all types of nitriles, the polymeric products differ in type depending upon the type of nitrile, and the conditions under which polymerization takes place. In numerous cases, nitriles polymerize to form trimeric polymerization products in which three nitrile groups combine to form the triazine ring:

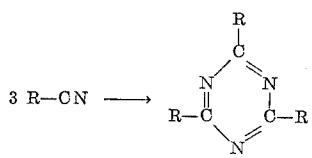

where R is any radical. Polymerization of this type takes place only when no CH or $CH_2$ group is attached to the cyanide group. Among the compounds which are known to polymerize to form the triazine ring are: cyanogen chloride, benzonitrile, trichloroacetonitrile, cyanic acid, and cyanamide. On the other hand, polymerization to form the triazine ring has never been reported for cyanogen, hydrogen cyanide, acrylonitrile, acetonitrile, or propionitrile. The polymerization to tricyanotriazine has been accomplished only by means of a multi-step process involving: (1) dehydration of ethyl oxamate to ethyl cyanoformate, (2) polymerization of ethyl cyanoformate to triethylcarboxytriazine, (3) aminolysis of the triazine product to the corresponding amide, and (4) dehydration of the amide to tricyanotriazine. See E. Ott, Ber., 52, 660 (1919).

Cyanogen, however, is known to polymerize to form a material known as paracyanogen, a black, highly inert solid of high molecular weight. The properties of this solid are relatively well defined and numerous methods for its prepartion have been reported. Paracyanogen is believed to be a long ribbon-shaped molecule, of indefinite length and molecular weight, of the general formula:

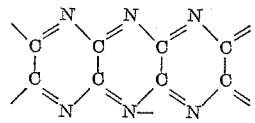

Paracyanogen is a dark, brownish-black solid material which is insoluble in water, organic solvents, and liquid cyanogen. It is insoluble in nitric acid but is partially soluble in strong caustic solution. It is also reported that paracyanogen dissolves in cold, concentrated sulfuric acid and can be recovered unchanged as a precipitate by dilution with water. It can be completely converted into cyanogen gas by heating to about 860° C. in a current of an inert gas such as nitrogen or helium. The molecular weight of paracyanogen is unknown and, in fact, indefinite, and so it is commonly designated as $(CN)_x$.

Many methods for the preparation of paracyanogen have been reported: V. Migrdichian, "The Chemistry of Organic Cyanogen Compounds," 1947, p. 362; H. E. Williams, "Cyanogen Compounds," 1948, p. 4; Beilsteins Handbuch der Organischen Chemie, 2 511 (1942), second supplement; and L. L. Bircumshaw, F. M. Taylor and D. H. Whiffen, J. Chem. Soc., 1954 931. Some of these methods for the preparation of paracyanogen are as follows:

(1) Paracyanogen forms when cyanogen is heated at atmospheric pressure at 310° C. or at lower temperatures under higher pressures. When the pressure is 300 atmospheres the temperature required is 220° C.

(2) Paracyanogen can be produced by the electrolysis of potassium cyanide solutions.

(3) Photopolymerization of cyanogen has been reported, as has polymerization initiated by alpha particles.

(4) Heating oxamide at 250°–300° C. in a sealed tube yields paracyanogen.

(5) Both cyanogen and paracyanogen are formed when either silver cyanide or mercuric cyanide is heated in a sealed tube above about 300° C.

It is therefore one object of this invention to provide new and improved carbon-nitrogen polymers which are derived from cyanogen or hydrogen cyanide.

Another object of this invention is to provide a new and improved method for polymerizing cyanogen or hydrogen cyanide to produce solid, stable polymers.

A feature of this invention is the provision of a new carbon-nitrogen polymer prepared by polymerizing cyanogen or hydrogen cyanide by contact with a catalyst at room temperature.

Another feature of this invention is the provision of an improved method for polymerizing cyanogen or hydrogen cyanide by contact with an aqueous solution of a weak acid and a cyanide salt at room temperature.

Other objects and features of this invention will become apparent from time to time throughout the specification and claims as hereinafter related.

This invention is based upon our discovery that novel carbon-nitrogen polymers are obtained, which do not have the properties of either tricyanotriazine or paracyanogen, when hydrogen cyanide or cyanogen is stored in contact with an aqueous solution of a weak acid (such as acetic, tartaric, boric, carbonic, hydrofluoric, chloracetic, citric, dimethylmalonic, ethylmalonic, formic, glutaric, malonic, etc. acids) containing a molar excess of a water-soluble cyanide salt, e.g., NaCN, KCN, NH$_4$CN, Mg(CN)$_2$, etc. When hydrogen cyanide or cyanogen is stored in contact with such an acid-cyanide solution at ambient temperature for an extended period of time, a solid black polymer is obtained which is neither tricyanotriazine or paracyanogen. The hydrogen cyanide or cyanogen may be polymerized at atmospheric pressure or at superatmospheric pressures ranging up to as much as 1000 atmospheres. The reaction proceeds satisfactorily at room temperature but the process is operative at temperatures in the range from 0° to 100° C.

The following non-limiting examples are illustrative of the scope of this invention:

Example I

A glass vial of 220 ml. volume was charged with 15 g. sodium cyanide, 25 ml. water, 25 ml. glacial acetic acid, and 14.0 g. cyanogen. The vial was sealed and allowed to stand at room temperature, with occasional agitation, for 5 weeks. At the end of this time, the vial was opened and the volatile material was allowed to escape into a hood. A black solid precipitate was recovered, purified by extraction with boiling water, and dried. The product which was obtained amounted to 8.97 g. of a black, odorless solid. This solid was insoluble in all common solvents.

The formation of the black polymer is dependent upon the amount of water-soluble cyanide salt (e.g., sodium cyanide) present in the reaction mixture. No reaction occurs in the absence of sodium cyanide. Also, if sodium cyanide is present in only catalytic amounts (less than a 1:1 mol ratio of sodium cyanide to cyanogen), the cyanogen is hydrolyzed rather than polymerized. This process is therefore dependent upon the presence of the water-soluble cyanide salt in a mol ratio of cyanide salt to cyanogen which is greater than 1:1.

The standard analytical laboratory techniques for analysis of nitrogen are inaccurate when applied to nitrogen-containing polymers such as paracyanogen, and it was therefore impossible to obtain a precise and exact analysis of the polymeric products. However, the black, solid polymer obtained in this experiment was analyzed for carbon, nitrogen, and hydrogen, and was subjected to thermal decomposition by heating at 850°–900° C. for a period of 2–3 hours. With common methods of analysis, composition of the polymer was: 35.9% carbon, 3.9% hydrogen, 37.3% nitrogen, and 22.9% unidentified residue. When the polymer was decomposed by heating to 850°–900° C. for 2–3 hours, there was left 10.7% of the polymer as a non-volatile residue. The volatile products of the decomposition contained 14.9% cyanogen, 22.2% hydrogen cyanide, and 52.2% of unidentified material, referred to the whole polymer. This polymer was also burned in oxygen and found to have a heat of combustion of 7030 b.t.u./lb. The solid polymers which are produced in this experiment are useful as a solid high-energy rocket fuel and are also useful as a non-toxic solid source for evolving cyanogen and/or hydrogen cyanide.

For comparison, paracyanogen was prepared by heating mercuric cyanide to 590° F. The black solid paracyanogen which was obtained analyzed: 36.5% carbon, 1.2% hydrogen, 43.0% nitrogen, and 19.2% unidentified residue. This paracyanogen was also decomposed by heating to 850°–900° C. for a period of 2–3 hours and the thermal decomposition products analyzed. The non-volatile residue consisted of only 1% of the weight of the paracyanogen. Unidentified volatile matter constituted 46.5% of the weight of paracyanogen, and there was obtained 44.3% cyanogen and 8.2% hydrogen cyanide. This paracyanogen was burned in oxygen and found to have a heat of combustion of 6860 b.t.u./lb. From these experiments, it is seen that the product which we have obtained is a polymer having properties which are markedly different from the paracyanogen which is obtained in accordance with classical procedures.

In carrying out this invention, the conditions of operation are not particularly critical. This process is operative over a wide range of pressures, from atmospheric pressure to as much as 1000 atmospheres or higher. The process is operative over a wide range of temperatures, from as low as 0° to as high as 100° C. or higher. The reaction proceeds satisfactorily, however, at ambient temperatures, preferably room temperature. The only factor which appears to be critical in the process is the proportion of soluble cyanide salt, as previously described. The amount of water-soluble cyanide salt present must be in a molar excess over the cyanogen. However, there is no known upper limit to the amount of water-soluble cyanide salt which may be used in this process. Also, the reaction time is not critical. While the initial reaction was allowed to proceed for 5 weeks, such a long reaction time is not necessary because a large amount of black solid was observed to form during the first day of the reaction.

Example II

In another experiment, several glass vials were charged with reactants, sealed, and allowed to stand at room temperature for 60 days with occasional agitation. One vial was charged with 25 ml. glacial acetic acid, 25 ml. water, and 7.2 g. hydrogen cyanide. No polymeric product was obtained. A second vial was charged with 25 ml. glacial acetic acid, 25 ml. water, 5 g. sodium cyanide, and 6.3 g. hydrogen cyanide. At the end of the 60-day period no product had formed. A third vial was charged with 25 ml. glacial acetic acid, 25 ml. water, 15 g. sodium cyanide, and 7.3 g. hydrogen cyanide. At the end of the reaction period, there was recovered 11.8 g. of a black solid material which was recovered by filtration, followed by water washing and drying. This black solid was odorless and insoluble in all common solvents. The fourth vial was charged with 25 ml. glacial acetic acid, 25 ml. water, 30 g. sodium cyanide, and 7.1 g. hydrogen cyanide. At the end of the reaction period, there was recovered 9.4 g. of a black solid polymer which was recovered by filtration, followed by water washing and drying. A fifth vial was charged with 25 ml. glacial acetic acid, 25 ml. water, and 15 g. sodium cyanide to determine whether or not sodium cyanide alone would polymerize under the reaction conditions. At the end of the 60-day period, no polymer was obtained from this vial.

The solid polymers obtained from the third and fourth reaction vials were analyzed for carbon, hydrogen, and nitrogen content, and were also subjected to thermal decomposition at 850°–900° C. The polymer obtained from the third and fourth vials contained 34.5% carbon, 4.2% hydrogen, 35.7% nitrogen, and an unidentified residue of 25.6%. Thus the polymer is seen to have a carbon, hydrogen, nitrogen, and residue content which corresponds closely to the cyanogen polymer obtained in Example I, but differs markedly from the composition of the paracyanogen obtained by pyrolysis of mercuric cyanide. As mentioned, the polymers obtained in Experiments 3 and 4 were subjected to thermal decomposition at 850°–900° C. The products of decomposition consisted of 10.7% cyanogen, 24.4% hydrogen cyanide, 12.3% non-volatile residue, and 52.6% unidentified volatile material, referred to the weight of whole polymer. Again, the decomposition products of this polymer correspond closely to the decomposition products obtained from the cyanogen polymer described in Example I, rather than the decomposition products of paracyanogen obtained from mercuric cyanide.

The polymer obtained in Experiments 3 and 4 had a heat of combustion of 8260 B.t.u./lb. and may be used as a solid rocket fuel. This polymer is also useful as a stable, solid, non-toxic source for cyanogen or hydrogen cyanide since both of these compounds are liberated from the polymer upon heating.

While we have described our invention fully and completely, as required by the patent laws, with special emphasis upon several preferred embodiments of the invention, we wish it to be understood that within the scope of the appended claims this invention may be practiced otherwise than as specifically described herein.

What is claimed is:

1. A method of preparing carbon-nitrogen polymers which comprises contacting a cyanide compound selected from the group consisting of cyanogen and hydrogen cyanide with an aqueous solution of a weak acid selected from the group consisting of acetic acid, tartaric acid, chloracetic acid, citric acid, dimethylmalonic acid, ethylmalonic acid, malonic acid, glutaric acid, formic acid, boric acid, carbonic acid and hydrofluoric acid and a water-soluble cyanide salt, at a mol ratio of cyanide salt to cyanide compound greater than 1:1, at ambient temperature for a time sufficient to effect the formation of a black solid polymer, and recovering the polymer from said solution.

2. A method in accordance with claim 1 in which the reaction temperature is in the range from about 0° to 100° C.

3. A method in accordance with claim 2 in which the reaction pressure is in the range from atmospheric pressure to 1000 atmospheres.

4. A method in accordance with claim 1 in which the weak acid is acetic acid.

5. A method in accordance with claim 1 in which the cyanide salt is sodium cyanide.

6. A method of preparing carbon-nitrogen polymers which comprises contacting hydrogen cyanide with an aqueous solution of acetic acid and sodium cyanide, at a mol ratio of sodium cyanide to hydrogen cyanide greater than 1:1, at a temperature of 0°–100° C., for a time sufficient to effect the formation of a black solid polymer.

7. A method of preparing carbon-nitrogen polymers which comprises contacting cyanogen with an aqueous solution of acetic acid and sodium cyanide, at a mol ratio of sodium cyanide to cyanogen greater than 1:1, at a temperature of 0°–100° C., for a time sufficient to effect the formation of a black solid polymer.

8. A carbon-nitrogen polymer produced in accordance with claim 6, containing carbon and nitrogen in substantially a 1:1 atomic ratio and yielding about 15% cyanogen and 22% hydrogen cyanide upon heating to 850° C.

9. A polymer produced in accordance with claim 7 containing carbon and nitrogen in substantially a 1:1 atomic ratio and yielding approximately 11% cyanogen and 24% hydrogen cyanide upon heating to 850° C.

No references cited.